Jan. 12, 1926. 1,569,818
B. L. LIGON
FISHING TOOL FOR WELLS
Filed Nov. 20, 1924
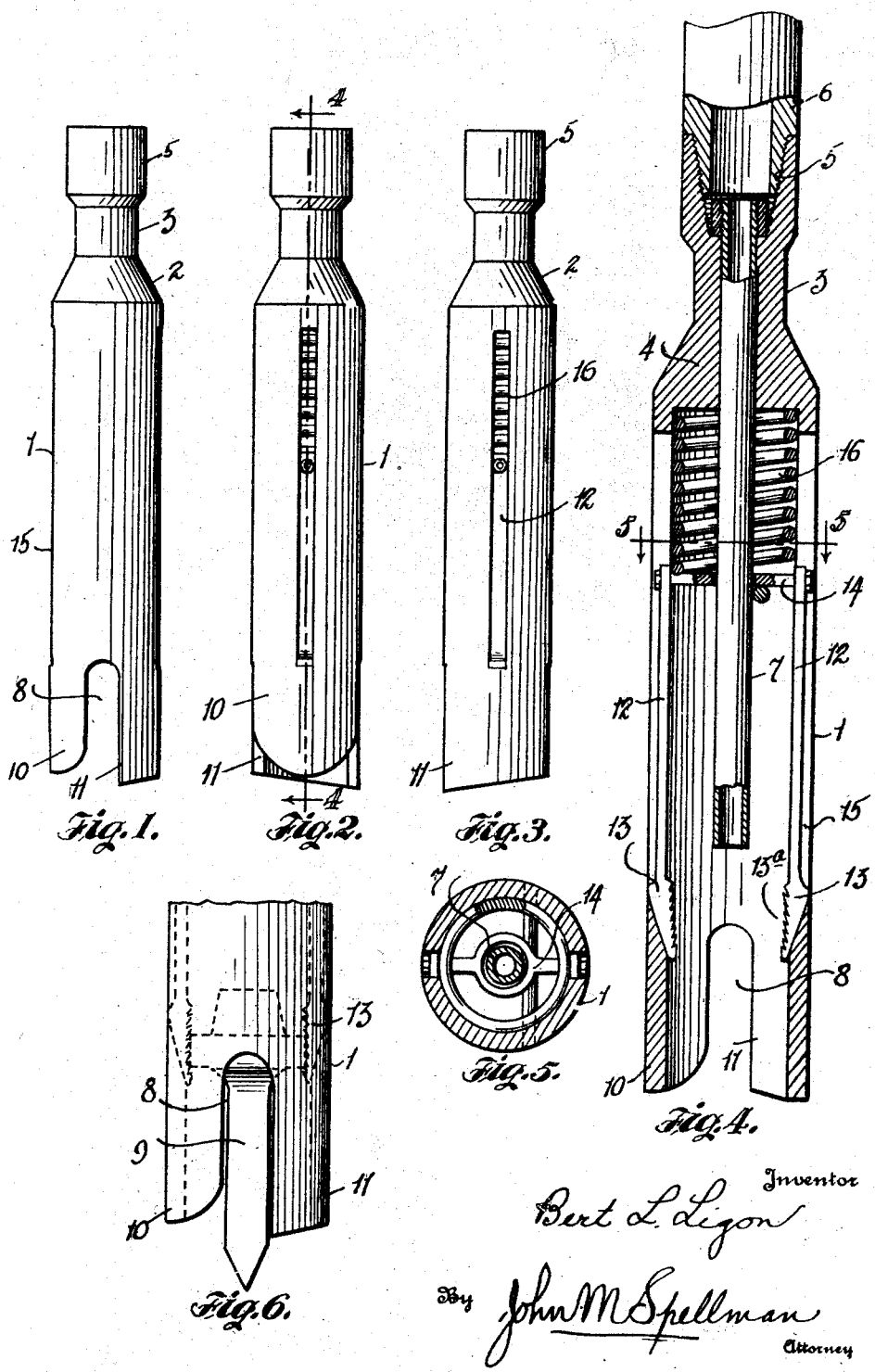

Patented Jan. 12, 1926.

1,569,813

UNITED STATES PATENT OFFICE.

BERT LESTER LIGON, OF ELECTRA, TEXAS, ASSIGNOR TO LIGON TOOL COMPANY, OF ELECTRA, TEXAS, A PARTNERSHIP.

FISHING TOOL FOR WELLS.

Application filed November 20, 1924. Serial No. 750,977.

*To all whom it may concern:*

Be it known that I, BERT LESTER LIGON, a citizen of the United States, residing at Electra, in the county of Wichita and State of Texas, have invented certain new and useful Improvements in Fishing Tools for Wells, of which the following is a specification.

This invention relates to improvements in equipment for well drilling and has particular reference to a fishing tool for use in such equipment.

The principal object of the invention is to provide a fishing tool for the recovery of drill bits or other objects dropped or otherwise lodged in the well, the tool being designed and constructed so that an extremely tight grip may be secured onto the drill bit; and, further, that the harder the pull on the drill stem carrying the tool, the tighter and more securely the tool will grip the object.

Another object of the invention is that the tool will automatically locate the lost bit by rotation of the drill stem, since as in fish tail bits, one end of the bit will lodge or become embedded in the wall of the hole.

In the drawing accompanying the description is illustrated a preferred form of contruction of the fishing tool, and wherein:

Figure 1 is a side elevational view of the tool removed from a drill stem or tubing.

Figure 2 is a similar view on a quarter turn of the tool.

Figure 3 is a side elevational view of the opposite side to that shown in Figure 2.

Figure 4 is an enlarged vertical sectional view of the tool showing it connected to a drill stem or tubing, the view taken of the tool on line 4—4 of Figure 2.

Figure 5 is a cross-sectional view taken on line 5—5 of Figure 4; and

Figure 6 is a fragmentary detail view of the lower end of the fishing tool and showing in dotted and full lines the manner of gripping and securing a fish tail bit.

Referring more in detail to the drawings, 1 denotes the body of the tool which has the usual tapered formation 2 and providing a reduced neck portion 3 for a wrench.

The tool has a solid head 4 and on its upper end is a tool joint box 5 for threadedly receiving a drill stem or tubing 6.

The head of the tool is centrally bored for the reception of a water feed line pipe 7— referred to hereinafter.

Attention is now directed to the lower end of the fishing tool and it will be seen by reference to the drawing; particularly Figures 1, 2, 3, and 4, that there is a longitudinal recess 8 on opposite sides of the lower end of the tool. These recesses extend upwardly sufficiently to enable a fishing tail bit 9 to be received therein, in the manner illustrated in Figure 6.

These openings 8—8 separate the tool into two lower end portions 10 and 11. These end portions are for the purpose of locating and causing the bit to assume an upright vertical position to enable it to enter the openings 8—8. The portion 10 is rounded to enable it to slide over the bit, while the portion 11, or finger, is slightly longer and has a slanting edge as clearly shown in Figure 2, and when portion 11 strikes the drill bit in the rotation of the drill stem or tubing in fishing for the bit, there will be a jar noticeable at the surface, hence the driller can ascertain when the bit is located. Sufficient rotation of the tool will cause the bit to be set up straight in the hole and enable it to enter the recesses 8—8.

In Figure 4 is shown the means for gripping the drill bit, which comprises two arms 12—12 with toothed jaws 13—13. These arms are carried on a cross arm 14. Slots 15—15 are for the purpose of gaining access to the arms in removing the bit.

A spring 16 is seated upon the cross-arm 14 with its upper end abutting the head 4. Upon impact of the tool carrying the drill stem, and when the bit has been engaged between the portions 10 and 11, the weight of the drill rod or tubing will contract the spring and permit the teeth 13$^a$ on jaws 13 to engage the object to be removed.

Particular attention is here directed to the shape of the jaws 13 and the angle of the teeth 13$^a$. These jaws have their outer surfaces at an angle to and rest upon the sloped wall of the tool body which encloses the slot 15, and the teeth are directed upwardly. When the jaws are thus forced down under compression of the spring 16, the teeth 13$^a$ will grip the bit, and the harder the pull, the tighter the grip will be. Also this grip is further augmented by the tapered jaws and the slanted portion of the tool body, since pressure on the jaws downwardly will force them more inwardly against the bit.

The feed water pipe 7 permits water under high pressure to first remove mud and cavings to the surface, which is necessary before the bit can be gripped.

It should also be understood that changes and modifications may be made in the construction of the tool without departing from the intent and meaning of the following claims.

I claim:

1. A fishing tool for wells comprising the combination of a cylindrical body with a solid head and a hollow interior; the lower end of the body provided with longitudinal upwardly extended openings and dividing the body at this point into two parts of unequal length; longitudinal slots on opposite sides of the tool body, arms in the slots; said arms having tapered and toothed jaws and adapted to be moved downward under compression of a spring to engage the object to be removed from the well; and means for attaching the tool to a drill stem or tubing, and a feed water pipe traversing the head and neck of the tool, communicating with the drill tubing and depending well within the hollow interior of the tool.

2. A fishing tool for wells comprising the combination of a tool body with a solid head and a hollow interior, the lower end of the body being provided with longitudinal slits or openings to conformably receive a relatively flat shaped drill to be removed from a well, said openings dividing the lower end of the tool into two portions of unequal length one of which comprises a finger for locating the drill to be removed, the two portions adapted to upright the bit in the hole and straddle it for removal; gripping jaws carried on arms under spring tension to grasp the bit and means for removing the bit from the tool.

3. A fishing tool as described comprising the combination of a head and a hollow cylindrical body; said body interiorly hollowed and having its lower end divided by longitudinal openings into two portions of unequal length adapted to straddle a bit for removal; one of said portions comprising a finger to locate the bit; arms on opposite sides of the tool body, slots adjacent thereto for access to the arms; said arms having tapered jaws with upwardly projecting teeth to engage a drill the jaws having their back or outer surfaces slanted inwardly and downwardly and movable against and upon the likewise slanted wall of the tool body in the bottom of said slots, to move it against the bit; a spring means to aid in advancing the jaws and means for attaching the tool to a drill stem.

In testimony whereof I have signed my name to this specification.

BERT LESTER LIGON.